United States Patent

[11] 3,624,059

| [72] | Inventors | Felix Bloyaert<br>Boitsfort/Bruxelles;<br>Andre Delbouille, Bruxelles; Jacques<br>Stevens, Braine L'Alleund, all of Belgium |
|---|---|---|
| [21] | Appl. No. | 430,207 |
| [22] | Filed | Feb. 3, 1965 |
| [45] | Patented | Nov. 30, 1971 |
| [73] | Assignee | Solvay & Cie |
| [32] | Priority | Feb. 7, 1964 |
| [33] | | France |
| [31] | | 963,086 |
| | | The portion of the term of the patent subsequent to Sept. 3, 1985, has been disclaimed. |

[54] PROCESS AND CATALYST FOR THE POLYMERIZATION AND COPOLYMERIZATION OF OLEFINS
4 Claims, No Drawings

[52] U.S. Cl. .................................................. 260/88.2,
252/429 C, 252/430, 260/93.7, 260/94.9 E
[51] Int. Cl. ........................................................ C08f 1/56,
C08f 3/06
[50] Field of Search .......................................... 260/94.9 D,
94.9 E, 88.2; 252/429 C, 430

[56] References Cited
UNITED STATES PATENTS

| 3,214,417 | 10/1965 | Bloyaert et al. ............... | 260/88.2 |
| 3,400,110 | 9/1968 | Dassesse et al. ............... | 260/88.2 |

FOREIGN PATENTS

| 1,306,453 | 9/1962 | France ....................... | |
| 860,407 | 2/1962 | Great Britain ............... | |

*Primary Examiner*—Joseph L. Schofer
*Assistant Examiner*—Edward J. Smith
*Attorneys*—Robert E. Burns and Emmanuel J. Lobato

ABSTRACT: A method of polymerizing and copolymerizing olefins with a novel catalyst comprising (a) the reaction product of an inorganic compound of a polyvalent metal having a valence of at least three, e.g., $TiCl_4$, and a solid, bivalent metal hydroxylated inorganic phosphate, e.g., $Ca_5(PO_4)_3OH$, or hydroxychloride, e.g., $Mg(OH)Cl$, (b) a metal, a hydride, or an organometallic compound of metals of Groups IVB, VB and VIB, e.g., $Sn(C_4H_9)_4$, and (c) a Group IIIB or VB halide, e.g., $AlCl_3$.

PROCESS AND CATALYST FOR THE POLYMERIZATION AND COPOLYMERIZATION OF OLEFINS

The present invention relates to a process for the polymerization and copolymerization of olefins in the presence of novel solid catalysts. In another aspect it relates to solid catalysts for olefin polymerization.

It is know to polymerize and copolymerize olefins in the presence of a ternary catalyst consisting of (a) a metal, a hydride, or an organometallic compound of metals of Groups IVB, VB, and VIB of the periodic table, (General Chemistry, Markham and Smith Houghton Mifflin Co., New York, New York, 1954, page 115 ) (b) a mineral compound of a polyvalent metal having a valence of at least three, and (c) a halide of an element of Group IIIB or Group VB (Belgian patent 547,618 ).

It is also known to polymerize olefins in the presence of supported binary catalysts. In particular, in the Belgian patent 552,550, it has been proposed to polymerize ethylene in the presence of a catalyst consisting of an organometallic compound and a derivative of a transition metal, deposited on an inert support such as silicon carbide, calcium phosphate, or magnesium or sodium carbonate.

French Pat. 1,291,788 shows the polymerization of olefins in the presence of a salt of a metal of Groups III, IV, V or VIII of the periodic table, deposited on a support consisting of an inorganic chloride with rhombohedral structure, containing no atom of oxygen. This catalyst is used with an organometallic cocatalyst.

In both processes discussed above and in a series of others of the same type, a binary catalyst based on titanium halide and alkylaminum is deposited on an inert support.

There has been perfected a series of catalysts associated with supports which are characterized by the fact that a compound of a transition metal is chemically bound to a hydoxylated support. The novel chemical combination obtained by the reaction of the compound of a transition metal with the hydroxyl groups of the support is then activated by an organometallic compound and preferably by an alkylaluminum.

Catalysts of this type have particular properties which depend on the nature of the support.

Such a catalyst is described particularly in the French patent 1,306,453. This catalyst is prepared by the reaction of an organometallic compound with a combination of a transition metal which is associated chemically with a hydroxylated inorganic phosphate.

Up to the present the polymerization of olefins in the presence of a ternary catalyst as defined above, deposited or associated with a support, has not been described.

It has now been discovered that, by chemically associating a ternary catalyst of the type defined above with hydroxylated supports, catalysts are obtained which have unexpected and particularly important properties.

The process according to the present invention consists of carrying out the polymerization or copolymerization of olefins in the presence of a catalyst which forms on mixing: (a) the product of the reaction between an inorganic compound of a polyvalent metal having a valence of at least three and a solid support chosen from the group including hydroxylated inorganic phosphates and hydroxychlorides of bivalent metals, (b) a metal, a hydride, or an organometallic compound of metals of Groups IVB, VB, and VIB of the periodic table, and (c) a halide of an element of Group IIIB or VB.

It is an object of this invention to provide an improved catalyst for the polymerization of olefins.

Another object is to provide a method of polymerizing and copolymerizing olefins such as ethylene and propylene.

Still another object is to provide an olefin polymerization process utilizing a supported catalyst having improved activity.

Various other objects, advantages and features of this invention will be apparent to those skilled in the art from the following discussion.

It has in fact been discovered that among the supports containing hydroxyl groups usable for the preparation of the novel catalysts, two particular types, the hydroxylated phosphates and the hydroxychlorides of bivalent metals, are distinguished by their aptitude for leading to highly active catalysts.

On the other hand, other solid hydroxylated compounds such as the silica aluminas lead to catalysts which are not very active, and some of them finally give completely inactive catalysts: This is the case with lime.

In the first group of supports, the hydroxylated phosphates, it has been observed that the calcium hydroxyapatite, with formula $Ca_5(PO_4)_3OH$, is particularly interesting. This product can be obtained by reaction between calcium nitrate and diammonium phosphate, or better still, from lime and phosphoric acid. This support is then activated by heating at a temperature of 200° to 1000° C.

Examples of other hydroxylated phosphates of bivalent metals are Beryllium hydroxyphosphate, magnesium hydroxyphosphate, barium hydroxyphosphate, zinc hydroxyphosphate, mercury hydroxyphosphate, and the like.

Another type of supports giving highly active catalysts consists of hydroxychlorides of bivalent metals M, corresponding to the formula $M(OH)Cl$. Preferably hydroxychlorides having a lamellar structure with thick piling up of the anions are used. Magnesium hydroxychloride especially corresponds to this condition and can be used advantageously.

Examples of other hydroxylated chlorides of bivalent metals are: beryllium hydroxychloride, strontium hydroxychloride, cadmium hydroxychloride, and the like.

These hydroxychlorides can be prepared according to conventional method, for example, from chlorides and oxides or hydroxides of bivalent metals. After reduction into particle fines and forceful drying, they can be used for the reaction with inorganic compounds of polyvalent metals.

The chemical fixation of the inorganic compounds of polyvalent metals is done by OH groups. If $M'$ represents a polyvalent metal and X a monovalent reactive group fixed on $M'$, the reaction with a hydroxylated support radicals OH can be represented as follows: $X_nM' + Z—OH \rightarrow Z—O—M'X_{n-1} + XH$ Examples of inorganic compounds of polyvalent metals having a valence of at least three that can be used for the preparation of the novel catalysts of the invention are those compounds that are hydrocarbon soluble and contain radicals that are reactive with hydroxyl groups; such compounds are selected, for example, from the halides and oxyhalides of the metals of Groups III, IV, V, VI and VIII. Examples of compounds that can be used are titanium tetrachloride, vanadium tetrachloride, vanadium pentachloride, vanadyl trichloride, vanadyl tribromide, chromyl chloride, chromium hexachloride, ferric chloride, aluminum iodide, and the like.

The fixation reaction of the inorganic compound of a polyvalent metal is accompanied by the liberation of decomposition products. When this compound is a chloride, a liberation of hydrogen chloride is observed, for example: $TiCl_4 + Z—OH \rightarrow Cl_3Ti—O—Z + HCl$ These decompositions products as well as the excess starting products are eliminated by washing the catalyst.

The fixation reaction must be carried out protected from moisture, for example by bringing to boiling a suspension of the hydroxylated compound in a hydrocarbon such as hexane, xylene, or tetralin, where the inorganic compound of a polyvalent metal is dissolved. Generally an increase in the amount of the polyvalent metal compound fixed on the support is observed when the reaction temperatures is raised.

As soon as the reaction is finished, the polyvalent metal compound is fixed chemically to the support; it cannot be eliminated therefrom by physical means such as washing.

The support-polyvalent metal compound combination thus obtained constitutes the first constituent of a novel ternary catalyst.

The second constituent of this catalyst, which must be chosen from the metals hydrides, or organometallic compounds of metals of Groups IVB, VB, and VIB of the periodic table, is preferably a tetraalkyltin, for example tetrabutyltin. Examples of metals, hydrides, or organometallic compounds of the metals of Groups IVB, VB, and VIB are: tin, lead, silane, phosphine, arsine, tellurium hydride, tetrabutyltin, tetracyclohexylantimony, tetrabenzyllead, tetraphenylgermanium, tetra(methylcyclopentyl)bismuth, tetrapropyltin, tetraethyllead, and the like. The organic radical of the organometallic compound can be alkyl, cycloalkyl, aryl or combinations thereof, such as alkaryl, aralkyl, alkcycloalkyl, and the like, and can contain up to eight carbon atoms.

The third constituent of the catalyst, which must be chosen from the halides of the Group IIIB and VB elements, is advantageously chosen among the halides of aluminum, particularly the chloride.

Examples of halides of the elements of Groups IIIB and VB are: boron chloride, aluminum chloride, gallium iodide, indium fluoride, thallium bromide, phosphorus trichloride, antimony trichloride, bismuth trichloride, arsenic fluoride, arsenous chloride, and the like.

The process according to the invention is applied to the polymerization and copolymerization olefins, preferably having two to eight carbons atoms, and especially to the manufacture of polyethylene polypropylene, poly(butene-1), poly(3-methylbutent-1), poly(4-methylpentent-1), poly(octene-1), and copolymers of ethylene-propylene and ethylene-butent-1

The use of ternary catalysts chemically bound to a support associates the advantages of the ternary catalysts with those of the supported catalysts. Furthermore, it allows, and this is particularly unexpected arsenous advantageous, polyolefins showing the exceptional properties to be manufactured.

Thus, the polyethylene prepared with the novel catalysts according to the invention contains less than one $CH_3$ group per thousand carbon atoms, shows no vinylidene double needs, and shows very low contents of vinyl double bonds and shows very low contents of vinyl double bonds and internal trans (bonds). Its true density is very high and exceeds 0.962 g./cm.$^3$.

Used for the copolymerization of ethylene and propylene, these novel catalysts allow, from a reaction mixture of given composition, copolymers to be obtained which are richer in propylene than those manufactured with the known catalysts.

The following examples, without being limitative, are intended to illustrate the present invention.

EXAMPLE I

Twenty grams of $MgCl_2 \cdot 6H_2O$ is heated at 200° C. in a ventilated oven. The molten and dehydrated mass thus obtained is ground, then brought to 285° C. in a quartz tube in a current of dry nitrogen. Thus magnesium hydroxychloride, Mg(OH)Cl, is obtained.

This product is immediately reacted with $TiCl_4$ by heating to boiling in a solution $TiCl_4$ in xylene. After reaction, the titanium chemically fixed on the support is determined and there is found 13.7 mg. Ti/g. of support.

Fifteen hundred mg. of impregnated support obtained as above is introduced into a 1.5-liter autoclave of stainless steel, with 10.7 ml. of a solution in hexane containing 200 g./liter of a mixture of $Sn(C_4H_9)4$ and $AlCl_3$ in a molar ratio $Sn(C_4H_9)4/AlCl_3$ of 1:1.

TABLE

| | Number of groups per 1,000 carbon atoms | | | |
|---|---|---|---|---|
| Type of catalyst used for the manufacture of polyethylene | $\begin{matrix}R\\ \diagdown\\ \phantom{R}\end{matrix}\begin{matrix}\phantom{}H\\ \diagup\\ \phantom{}\end{matrix}C=C\begin{matrix}\phantom{H}\\ \diagup\\ H\end{matrix}\begin{matrix}\phantom{R}\\ \diagdown\\ R^1\end{matrix}$ Trans | R-CH=$CH_2$ Vinyl | $\begin{matrix}R^1\\ \diagdown\\ R\end{matrix}C=CH_2$ Vinylidene | $CH_3$ Methyl |
| Ternary catalyst fixed on Mg(OH)Cl | 0.05 | 0.25 | <0.01 | <1 |
| Ternary catalyst not associated with a support [1] | 0.36 | 0.55 | 0.06 | 1 |

[1] Belgian patent 547,618.

The temperature of the autoclave is brought to 80° C. and the ethylene pressure to 213 p.s.i.a. After two hours of reaction, the autoclave is vented and 30 g. of polyethylene whose true density is 0.962 g./cm.$^2$ is withdrawn.

The results of the analysis of this polyethylene by infrared spectrometry are given the following table, where they are compared with those characterizing a polyethylene obtained in contact with a ternary catalyst which is not chemically associated with a support.

EXAMPLE II

Into a 1.5-liter stainless steel autoclave 1255 mg. of calcium hydroxylapatite of the formula $Ca_5(PO_4)_3OH$, activated by heating at 300° C. for 24 hours, on which 15.8 mg. of Ti has been chemically fixed by reaction with $TiCl_4$ in solution in hexane, is introduced.

The autoclave is then swept by a current of dry propylene. Then 9.3 ml. of a solution in hexane containing 410 g./liter of $Sn(C_4H_9BO4$ and 126 g./liter of $AlCl_3$ (molar ratio Sn/Al = 1.25) is introduced therein. Then 335 g. of propylene is condensed therein. The temperature of the autoclave is brought to 40° C. and at this temperature gaseous ethylene is introduced therein until the pressure reaches a constant value of 437 p.s.i.a. At equilibrium, the molecular composition of the liquid mixture of monomers is 70 mol percent propylene and 30 percent ethylene.

After four hours of reaction, the autoclave is vented and 73 g. of a rubbery ethylene-propylene copolymer containing about 20 mol percent of propylene is withdrawn from the autoclave. Its intrinsic viscosity is 0.35 g.

As will be apparent to those skilled in the art, various other modifications can be made in this invention without departing from the spirit or scope thereof.

We claim:

1. A catalyst which forms on mixing components comprising (a) the reaction product of titanium tetrachloride, with a solid support which is magnesium hydroxychloride, (b) $Sn(R)_4$, R being alkyl, cycloalkyl, aryl or combinations thereof containing up to eight carbon atoms, and (c) a halide of aluminum.

2. A catalyst according to claim 1, in which said component (c) is aluminum chloride.

3. A polymerization process which comprises a contacting under polymerization conditions at least one olefin having two to eight carbon atoms with catalyst which forms on mixing components comprising (a) the reaction product of titanium tetrachloride, with a solid support which is magnesium hydroxychloride, (b) $Sn(R)_4$ R being alkyl, cycloalkyl, aryl or combinations thereof containing up to eight carbon atoms, and (c) a halide of aluminum.

4. A polymerization process according to claim 3, in which said component (c) is aluminum chloride.

* * * * *